United States Patent
Mays et al.

(10) Patent No.: US 6,838,989 B1
(45) Date of Patent: Jan. 4, 2005

(54) RFID TRANSPONDER HAVING ACTIVE BACKSCATTER AMPLIFIER FOR RE-TRANSMITTING A RECEIVED SIGNAL

(75) Inventors: Wesley M. Mays, Albuquerque, NM (US); Brad David Moore, San Antonio, TX (US)

(73) Assignee: Intermec IP Corp., Woodland Hills, CA (US)

( * ) Notice: Subject to any disclaimer, the term of this patent is extended or adjusted under 35 U.S.C. 154(b) by 0 days.

(21) Appl. No.: 09/470,327

(22) Filed: Dec. 22, 1999

(51) Int. Cl.[7] .............................................. G08B 13/14
(52) U.S. Cl. .................................... 340/572.1; 342/51
(58) Field of Search .................... 455/456, 41, 403, 455/151.2, 73, 106, 227, 67.1; 370/527, 204, 205; 340/572.2, 572.4, 572.5, 572.8, 10.1, 10.3, 10.4, 505, 572.1; 342/42–51, 30–32

(56) References Cited

U.S. PATENT DOCUMENTS

| | | | |
|---|---|---|---|
| 3,685,050 A | 8/1972 | Cartwright ...................... 342/6 |
| 4,009,446 A | 2/1977 | De Koning et al. ......... 330/287 |
| 4,150,382 A | 4/1979 | King ........................... 343/754 |
| 4,739,328 A | 4/1988 | Koelle et al. .............. 342/51 X |
| 4,786,907 A | 11/1988 | Koelle ......................... 342/51 |
| 4,902,985 A | 2/1990 | Arthur et al. ............... 330/287 |
| 4,961,058 A | 10/1990 | Sigmon .......................... 331/9 |
| 5,030,807 A | 7/1991 | Landt et al. ............... 235/375 |
| 5,164,719 A | 11/1992 | Guena et al. ............ 342/51 X |
| 5,305,469 A | 4/1994 | Camiade et al. .......... 342/51 X |
| 5,373,297 A | 12/1994 | Briguglio ...................... 342/15 |
| 5,497,140 A | 3/1996 | Tuttle ......................... 340/10.1 |
| 5,606,323 A | 2/1997 | Heinrich et al. ......... 340/10.34 |
| 5,701,127 A * | 12/1997 | Sharpe ......................... 342/42 |
| 5,757,241 A | 5/1998 | Simonutti ..................... 331/55 |
| 5,952,922 A * | 9/1999 | Shober ..................... 340/572.4 |
| 5,955,969 A * | 9/1999 | D'Hont ...................... 340/928 |
| 6,243,012 B1 * | 6/2001 | Shober et al. ........... 340/572.7 |
| 6,525,648 B1 * | 2/2003 | Kubler et al. ............ 340/10.33 |
| 2001/0044315 A1 * | 11/2001 | Aoki et al. .................. 455/524 |
| 2002/0044058 A1 * | 4/2002 | Heinrich et al. ......... 340/572.1 |

OTHER PUBLICATIONS

"Microwave and RF Circuits: Analysis, Synthesis and Design" Max W. Medley; 1993 Artech House, Inc.; pp. 192–209.

* cited by examiner

*Primary Examiner*—Thomas Mullen
(74) *Attorney, Agent, or Firm*—O'Melveny & Myers LLP

(57) ABSTRACT

An RFID transponder is provided with an active backscatter amplifier that amplifies and re-transmits a received signal. The RFID transponder comprises an antenna and a circulator having a first port connected to the antenna. A modulator is connected to a second port of the circulator. An amplifier is connected to a third port of the circulator, with the amplifier connected to the modulator. An RF signal impinging upon the antenna passes through the circulator, the amplifier, and the modulator, and returns to the antenna through the circulator. The modulator further comprises an input coupled to the second port of the circulator and an output coupled to an input of the amplifier. The amplifier has an output coupled to the third port of the circulator. The modulator is adapted to modulate the RF signal using on-off keying.

17 Claims, 3 Drawing Sheets

RFID TRANSPONDER HAVING ACTIVE BACKSCATTER AMPLIFIER FOR RE-TRANSMITTING A RECEIVED SIGNAL

BACKGROUND OF THE INVENTION

1. Field of the Invention

The present invention relates to radio frequency (RF) communications, and more particularly, to an RFID transponder having an active amplifier that receives a signal, and then amplifies and re-transmits the received signal on the same frequency.

2. Description of Related Art

Wireless communication systems that communicate signals over the RF spectrum are well known in the art. Such systems have numerous diverse applications, including cordless and cellular telephones, paging, wireless computer networks, mobile radio for police, fire and municipal services, remote control devices for garage doors and other devices, and remote data sensing, to name just a few. A drawback of all such communication systems is that the radiated power becomes attenuated over distance. Accordingly, it is known to introduce one or more amplifier units between a source and destination of an RF signal, known as repeaters. Such repeater stations amplify and retransmit a received signal in order to make up for the power loss between the source and destination. Repeater systems are advantageous for many applications, but nevertheless add cost and complexity to a communication system that would be unacceptable for many applications. Another drawback is that it is necessary to maintain isolation between receiving and transmitting antennas of the repeater system in order to avoid interference between the received and transmitted signals.

One wireless communication application that is particularly sensitive to such range limitations and the drawbacks of conventional repeaters is radio frequency identification (RFID) technology. In the automatic data identification industry, the use of RFID transponders (also known as RFID tags) has grown in prominence as a way to track data regarding an object to which the RFID transponder is affixed. An RFID transponder generally includes a semiconductor memory in which digital information may be stored, such as an electrically erasable, programmable read-only memory (EEPROMs) or similar electronic memory device. Under a technique referred to as "backscatter modulation," the RFID transponders transmit stored data by reflecting varying amounts of an electromagnetic field provided by an RFID interrogator by modifying their antenna matching impedances.

The RFID transponders may either extract their power from the electromagnetic field provided by the interrogator, or alternatively, may include their own power source. RFID transponders that include a power source are particularly advantageous in applications in which maximum range is desired, such as in remote vehicle toll collection and transportation monitoring. Notwithstanding this performance advantage of battery-powered RFID transponders over field-powered RFID transponders, there is a continuing demand to further increase the range at which such RFID transponders can communicate without having to make associated increases in size, weight and cost of the RFID transponders. Accordingly, it would be very desirable to provide a method for increasing the effective range of an RFID transponder as well as for other types of RF communication systems without increasing the size, weight or cost of the transponder.

SUMMARY OF THE INVENTION

In accordance with the teachings of the present invention, an RFID transponder is provided that includes an active backscatter amplifier which amplifies and re-transmits a received signal. The active backscatter amplifier significantly increases the range of an RFID communication system.

More particularly, the RFID transponder comprises a modulator and an amplifier connected to an antenna. An RF signal impinging upon the antenna passes through the amplifier and the modulator, and returns to the antenna. The RFID transponder may further include a circulator comprising an active electronic device having three ports that offer separation between each port such that a signal impinging on any one port is transferred to another port thereof. The circulator effectively separates the antenna from the amplifier and modulator, and permits communication of signals to and from the antenna simultaneously.

In an embodiment of the invention, the active backscatter amplifier is adapted to detect data modulated in the RF signal impinging upon the antenna. The active backscatter amplifier thereby recovers the data modulated in the RF signal. In another embodiment of the invention, the active backscatter amplifier includes a down-conversion mixer coupled to the second port of the circulator. The down-conversion mixer is adapted to mix the RF signal with a carrier signal to provide an intermediate frequency signal. The down-conversion mixer is further coupled to the modulator to provide the intermediate frequency signal thereto. An up-conversion mixer is coupled to the third port of the circulator. The up-conversion mixer is adapted to mix the RF signal with the carrier signal to provide an RF modulated signal.

A more complete understanding of the RFID transponder having an active backscatter amplifier for re-transmitting a received signal will be afforded to those skilled in the art, as well as a realization of additional advantages and objects thereof, by a consideration of the following detailed description of the preferred embodiment. Reference will be made to the appended sheets of drawings which will first be described briefly.

DESCRIPTION OF THE PREFERRED EMBODIMENT

The present invention satisfies the need for an RF communication system, in particular an RFID communication system, having increased effective range. In the detailed description that follows, like element numerals are used to describe like elements illustrated in one or more of the figures.

Figure 1:
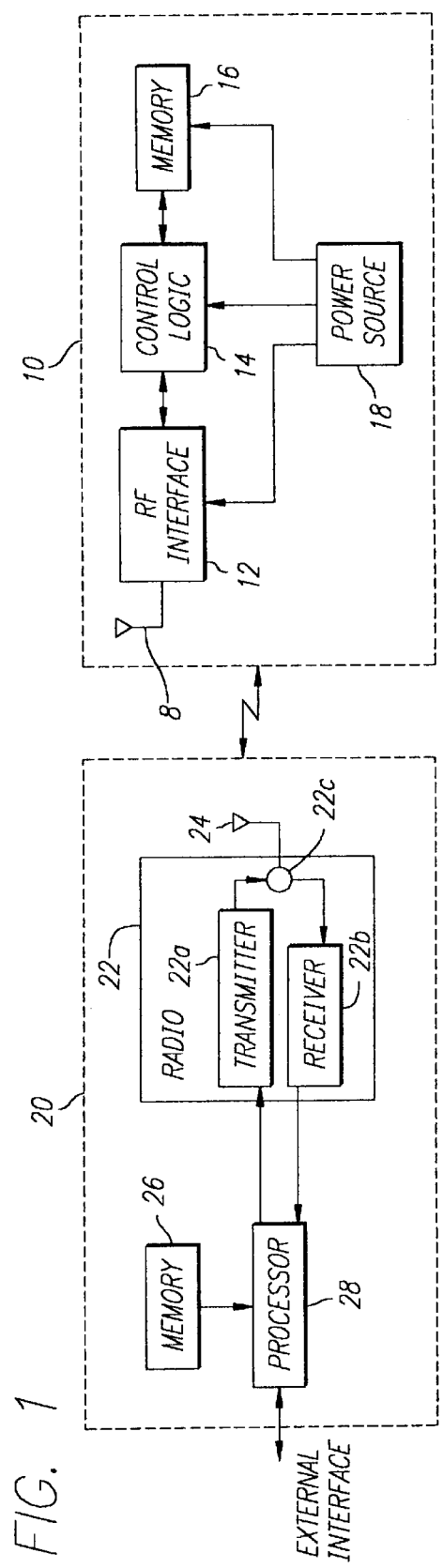
FIG. 1 is a block diagram of an exemplary RFID communication system.

Referring first to FIG. 1, an exemplary RFID communication system is illustrated including an RFID transponder 10 and an RFID reader 20. The RFID transponder 10 includes an antenna 8, an RF interface 12, a control logic block 14, a memory 16, and a power source 18. The RF interface 12 is coupled to the antenna 8, and may include an RF receiver that recovers analog signals that are transmitted by the RFID reader 20 and an RF transmitter that sends data signals back to the RFID reader. The RF transmitter may further comprise a modulator adapted to modulate data signals that are transmitted back to the RFID reader 20 (described below). The control logic block 14 controls the functions of the RFID tag 10 in response to commands provided by the RFID reader 20 that are embedded in the recovered RF signals. The control logic block 14 accesses the memory 16 to read and/or write data stored therein. The control logic block 14 also converts analog data signals recovered by the RF interface 12 into digital signals comprising the received commands, and converts digital data retrieved from the memory 16 into analog signals that are modulated by the RF interface 12. The power source 18 provides electrical power for the RF interface 12, the control logic block 14, and the memory 16, and may be provided by a battery.

The RFID reader 20 comprises a processor 28, a memory 26, a radio module 22, and an antenna 24. The processor 28 processes data signals received from the RFID transponder 10. The memory 26 includes a random access memory (RAM) and a read-only memory (ROM) to provide storage for program instructions, parameters and data for the processor 28. The radio module 22 provides for RF communications to/from the RFID transponder 10 under the control of the processor 28. The radio module 22 further comprises a transmitter portion 22a, a receiver portion 22b, and a circulator 22c. The antenna 24 is coupled to the circulator 22c. The transmitter portion 22a may further include a local oscillator that generates an RF carrier frequency. The transmitter portion 22a sends a transmission signal modulated by the RF carrier frequency to the circulator 22c, which in turn passes the signal to the antenna 24. The antenna 24 broadcasts the modulated signal and captures signals radiated by the RFID transponder 10. The antenna 24 then passes the captured signals back to the circulator 22c, which forwards the signals to the receiver portion 22b. The receiver portion 22b recovers the information signal contained in the received signals, and passes the information signal to the processor 28.

In a preferred embodiment of the invention, the RFID reader 20 communicates signals to the RFID transponder 10 using amplitude modulation such as on-off keying (OOK). It should be appreciated that other known modulation schemes may also be utilized, including phase modulation such as phase shift keying (PSK), or frequency modulation such as frequency shift keying (FSK). The RFID transponder 10 recovers the amplitude modulated signals, which may contain commands that are to be executed by the RFID transponder 10 or data to be written into the memory 16 of the RFID transponder. The RFID transponder 10 transmits signals back to the RFID reader 20 using backscatter modulation. The RFID reader 20 transmits a carrier wave (CW) signal that does not contain any modulation, and the RFID transponder 10 amplitude modulates the data by varying the impedance match between the antenna 8 and the RF interface 12. The impedance mismatch causes the CW signal to be reflected back to the RFID reader 20 in a process referred to as backscatter modulation. The RFID reader 20 thereby recovers the backscatter modulated data from the reflected signal.

Figure 2:
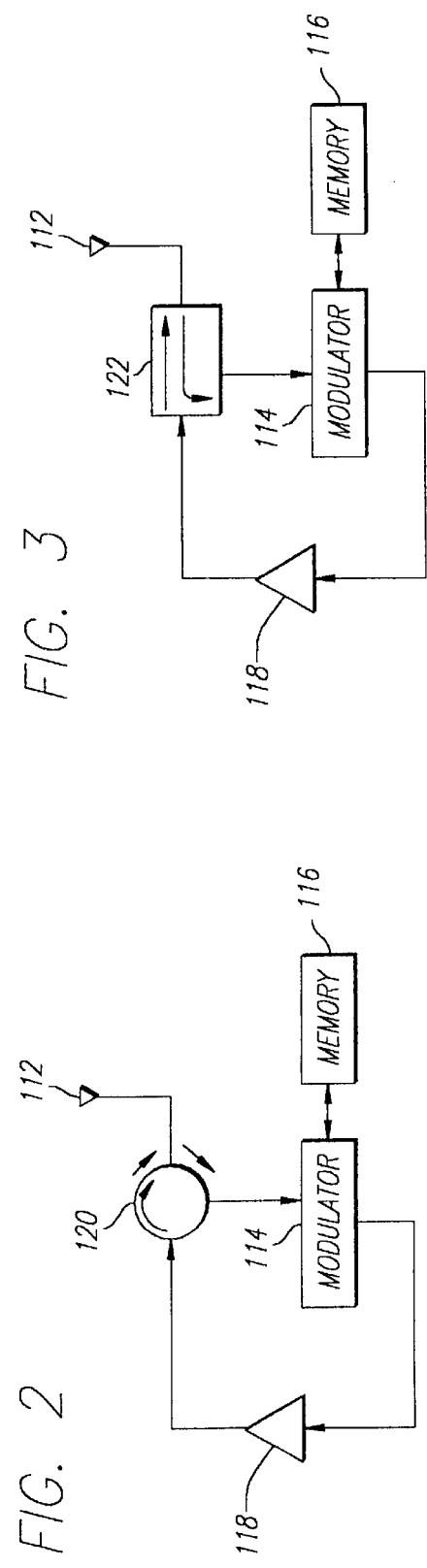
FIG. 2 is a block diagram of an RFID transponder having an active backscatter amplifier in accordance with an embodiment of the invention.

Referring now to FIG. 2, a block diagram of an RFID transponder in accordance with a first embodiment of the invention is illustrated. The RFID transponder comprises an antenna 112, a circulator 120, a modulator 114, a memory 116, and an amplifier 118. The circulator 120, modulator 114, memory 116, and amplifier 118 may be disposed on an integrated circuit chip that is disposed on a substrate (not shown). The antenna 112 may be integrally formed on the substrate. Preferably, the antenna 112 comprises thin (e.g., 18 to 35 microns thickness) lines formed of a conductive metal, such as copper. These lines may be formed by plating or adhering or screening a thin layer of copper (or other conductive metal) onto the substrate. This layer may then be etched to form the specific geometric configuration (e.g., dipole, folded dipole, loop, coil, spiral, meander, and the like) of the antenna. Similarly, one or more impedance adjustment elements may be integrally formed on the substrate to modify the impedance of the antenna to improve its match with the integrated circuit chip.

In a preferred embodiment of the present invention, the circulator 120 comprises an active electronic device having three ports that offers separation between each port such that a signal impinging on any one port is transferred to another port thereof. As shown in FIG. 2, the circulator 120 has a first port connected to the antenna 112, a second port connected to the modulator 114 and a third port connected to the amplifier 118. The modulator 114 is connected to the amplifier 118. The memory 116 is coupled to the modulator 114 in the manner described above with respect to FIG. 1. Alternatively, it should be appreciated that the circulator 120 may be comprised of a magnetic, non-reciprocal device as conventionally known in the communications art, though it should be appreciated that such a device would make it more difficult to satisfy the desired object of the invention of providing an RFID transponder having a small size.

As described above, any signal impinging on a port of the circulator 120 is transferred to the adjacent port. Upon transfer to an adjacent port, the signal flows out of that port to any connected load. If the load impedance is not matched to the circulator port impedance, then a portion of the RF signal is reflected back into the circulator port and is transferred to the next adjacent port. More particularly, if the impedance of the antenna 112 is perfectly matched to the first port, then any signal from the first port is completely radiated by the antenna and there is no reflected component. Similarly, any received signal impinging on the antenna 112 enters the circulator 120 through the first port and is transferred to the modulator 114 connected to the second port. In a preferred embodiment of the invention, the modulator 14 provides amplitude modulation of a signal passing from the second port of the circulator 120, although other known types of modulation could also be advantageously utilized as described above. It should also be appreciated that the order of placement of the modulator 114 and the amplifier 118 could be reversed.

For example, in a first data state of the amplitude modulation, the signal from the circulator 120 passes through the modulator 114 to the amplifier 118 essentially unperturbed. In a second data state of the amplitude modulation, no signal (or a signal having reduced amplitude) passes amplifies the signal from the modulator 114 and passes the amplified signal to the third port of the circulator 120, which in turn passes the amplified signal to the first port connected to the antenna 112. The amplified signal is thereby radiated by the antenna 112. Thus, any signal that impinges on the antenna 112 is modulated (if desired), amplified, and re-transmitted on the same frequency. The amount of amplification that is provided to the signal by the amplifier 118 depends upon the quality of the impedance match and corresponding voltage standing-wave ratio (VSWR) with the antenna 112. The active backscatter amplifier can operate in three separate modes. In a first mode, a received signal is modulated by the modulator 114 and re-transmitted, as described above. In a second mode, a received signal is re-transmitted without adding any modulation, i.e., the modulator 114 is keyed on. The active backscatter amplifier operates like a repeater in the second mode. In a third mode, the active backscatter amplifier receives a signal but does not re-transmit any signal, i.e, the modulator 114 is keyed off.

It should be appreciated that RFID transponder of the present invention could enable greater distances between the RFID transponder and the RFID reader than that achieved by conventional systems. For example, the RFID transponder could be used in a wireless local area network and/or microwave distribution system to enhance and expand coverage. The RFID transponder could also be used in remote monitoring of power distribution systems, water, sewer, weather monitoring, flood monitoring, and natural disaster tracking systems to replace repeaters at much lower cost. Lastly, the RFID transponder could be used in place of multiple repeater systems currently used by municipalities to provide continuous service of a large are area to police, fire department or other municipal use of radio communication links. The particular configuration of the RFID transponder would depend on the expected end use of the device.

Figure 3:
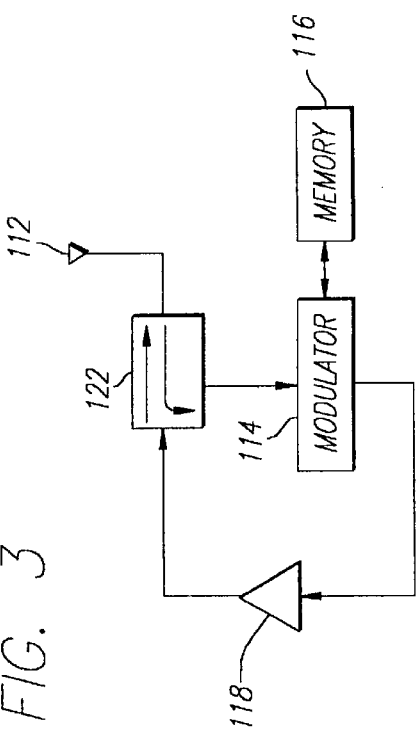
FIG. 3 is a block diagram of an RFID transponder having an active backscatter amplifier in accordance with an another embodiment of the invention.

Referring now to FIG. 3, a block diagram of an RFID transponder in accordance with a second embodiment of the invention is illustrated. The RFID transponder of FIG. 3 is similar in construction to the RFID transponder of FIG. 2, except that a directional coupler 122 is used in place of the circulator 120. The directional coupler 122 permits simultaneous RF communications therethrough in opposite directions. Accordingly, a signal from the antenna 112 passes through the directional coupler 122 to the modulator, and an amplified signal from the amplifier 118 passes through the directional coupler to the antenna. Alternatively, a power divider could be utilized in place of the directional coupler 122, or the antenna 112 could be directly coupled to the modulator 114 and amplifier 116 without any intermediary device. It should be appreciated that such embodiments would likely not operate as efficiently as the electronic circulator 120 of FIG. 2 or the directional coupler 122 of FIG. 3 due in part to impedance mismatches between the antenna 112 and the modulator 114 and/or the amplifier 116. It should also be appreciated that a directional coupler or power divider would also have size constraints that would be undesirable in providing a RFID transponder having a small size.

Figure 4:
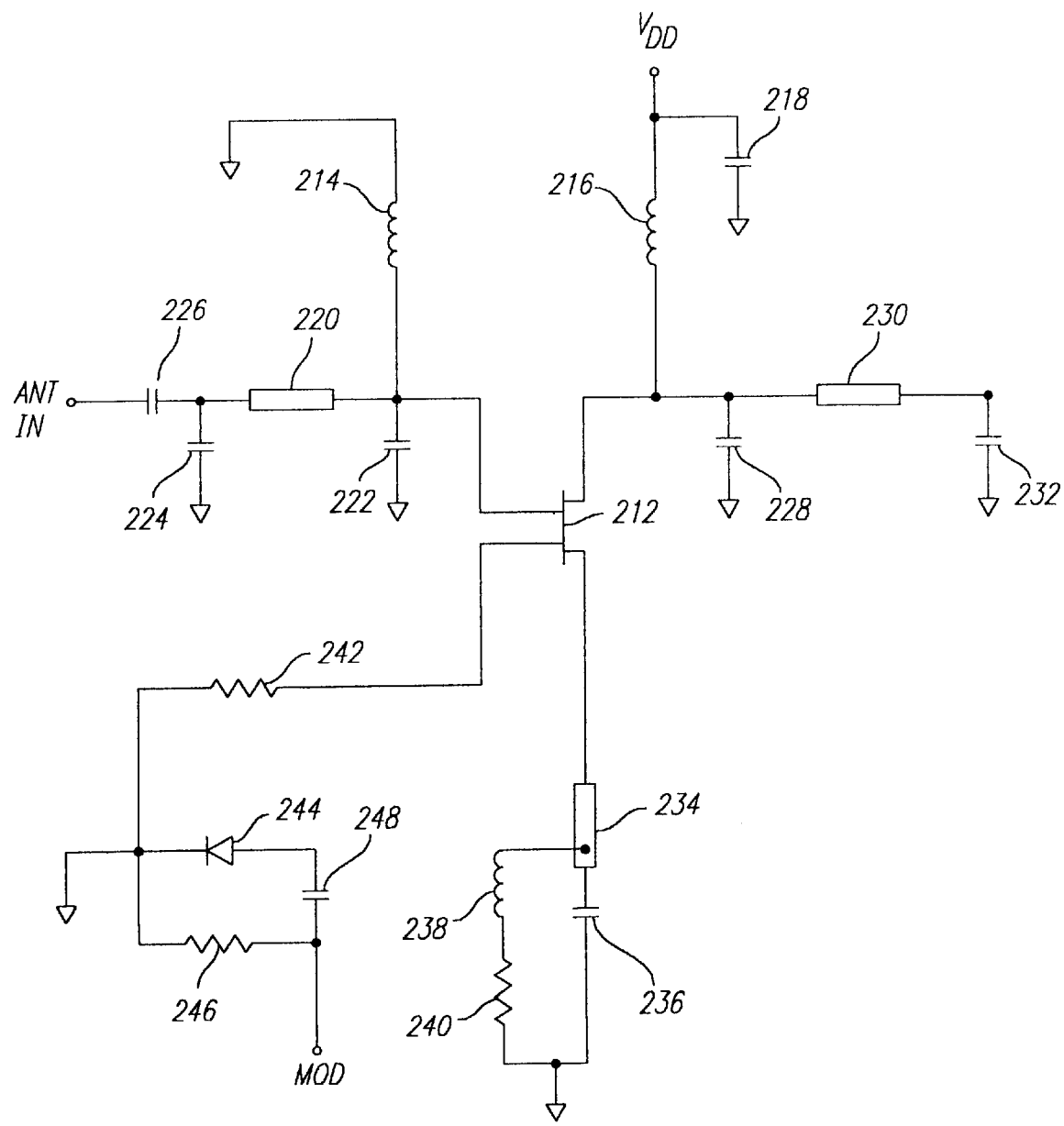
FIG. 4 is a schematic diagram of an active backscatter amplifier.

FIG. 4 illustrates an electrical schematic of a active backscatter amplifier particularly adapted for use in the RFID transponder of the present invention. The active backscatter amplifier includes a dual-gate field effect transistor (FET) 212 having a feedback loop defined between its input and output in order to generate a negative resistance. As will be further described below, the FET 212 operates in a transmitting mode in which signals communicated by the RFID reader are reflected and amplified by the active backscatter amplifier. The FET 212 may also be adapted to operate in a receiving mode in which signals communicated by the RFID reader are received by the RFID transponder. It is anticipated that the active backscatter amplifier of FIG. 4 be provided on an integrated circuit, such as an application specific integrated circuit (ASIC).

The FET 212 includes a first gate terminal coupled to the antenna (ANT IN) through an impedance matching circuit comprising a microstrip line 220 and capacitor 226. An inductor 214 provides an RF choke between the first gate terminal and ground, and capacitors 222, 224 decouple the impedance matching circuit from ground at microwave frequencies. The impedance matching circuit matches the impedance of the antenna to the integrated circuit. A second gate terminal of the FET 212 receives a modulation signal (MOD) through a filter circuit including resistors 242, 246 and capacitor 248. A schottky diode 244 is coupled between the second gate terminal of the FET 212 and ground. The drain terminal of the FET 212 is coupled to the supply voltage ($V_{DD}$) through an inductor 216. The supply voltage terminal is decoupled from ground at microwave frequencies by a capacitor 218. The drain terminal of the FET 212 is also coupled to a load provided by a microstrip line 230 and capacitors 228, 232. The source terminal is coupled to a feedback circuit including a microstrip line 234, inductor 238, and resistor 240. The feedback circuit is decoupled from ground at microwave frequencies by a capacitor 236. As known in the art, the dimensions of the microstrip lines 220, 230, 234 may be selected to provide desired impedance levels.

The FET 212 is biased to operate in a transmitting mode. When a signal from the RFID reader is present on the antenna, the received signal is conducted to the first gate terminal of the FET 212. This causes the FET 212 to operate as an amplifier and conduct current in correspondence with the received signal into the feedback loop coupled to the source terminal. If there is a modulation signal on the MOD input, then the modulation signal is conducted to the second gate terminal of the FET 212, causing the FET to attenuate current in correspondence with the modulation signal. This effectively modulates the received signal with the modulation signal to produce an amplified, modulated signal at the source terminal of the FET 212. The amplified, modulated signal passes through the feedback loop and is coupled back to the antenna through ground. If there is no-modulation signal on the MOD input, then the received signal is amplified and coupled back to the antenna in the same manner but without modulation. The active backscatter amplifier may also be configured to operate as a receiver by recovering the received signal at the load coupled to the drain terminal of the FET 212. It should be appreciated that this is simply one embodiment of a active backscatter amplifier, and that other embodiments can also be advantageously utilized.

Figure 5:
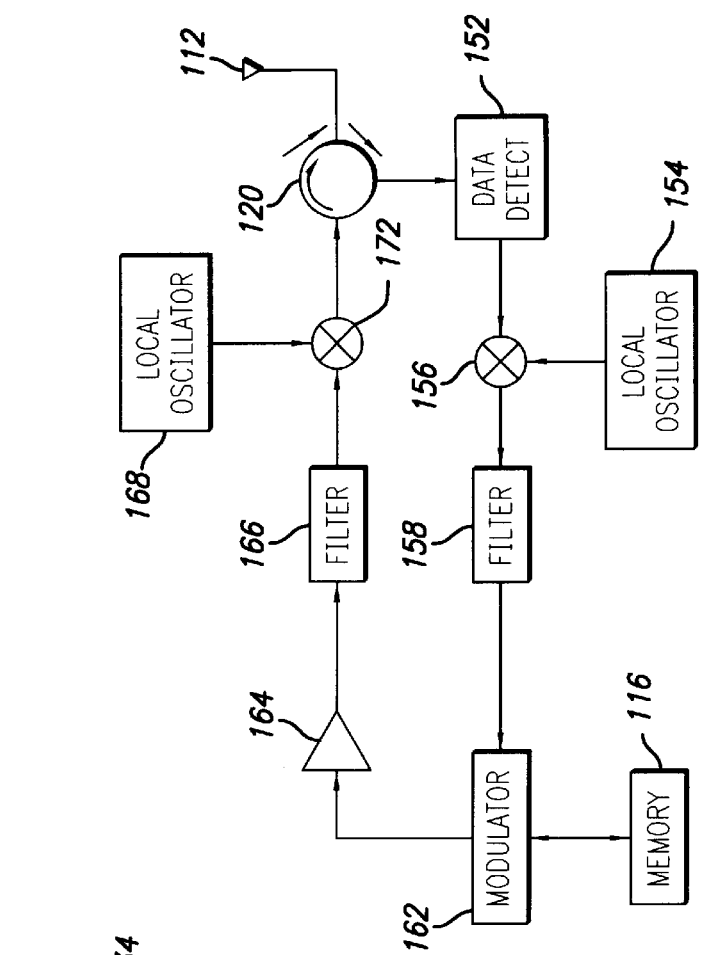
FIG. 5 is a block diagram of an RFID transponder having an active backscatter amplifier in accordance with another embodiment of the invention.

Referring now to FIG. 5, a block diagram of an RFID transponder in accordance with a third embodiment of the invention is illustrated. The RFID transponder of FIG. 5 is generally similar to the embodiments described above, but further includes an ability to receive data as well as transmit data, and therefore provides data read and write capability. The RFID transponder comprises an antenna 112 and circulator 120 as described above with respect to FIGS. 2 and 4. In addition, the RFID transponder includes a data detect block 132, a data decode block 134, a processor 136, an amplifier 138, a modulator 142, and a filter 144. The circulator 120 has a first port connected to the antenna 112, a second port connected to the data detect block 132 and a third port connected to the filter 144. The data detect block 132 is connected to the data decode block 134 and the amplifier 138. The amplifier 138 is connected to the modulator 142, which is in turn connected to the circulator 120 through the filter 144. The processor 136 is connected to the memory 116 and the data decode block 134, and provides control signals to the amplifier 138 and the modulator 142. The term "processor" is used generally herein to refer to a circuit device capable of performing multiple tasks, such as controlling other devices and processing signals; and may comprise a microprocessor, a digital signal processor (DSP), an application specific integrated circuit (ASIC), a field programmable gate array (FPGA), and the like. The filter 144 is provided to remove noise from the amplified and/or modulated signal, and may be optionally included depending on the desired performance characteristics of a particular embodiment of the active backscatter amplifier.

A received signal that impinges on the antenna 112 is passed through the circulator 120 to the data detect block 132. The data detect block 132 is adapted to detect modulation on the received signal. As described above, a received signal may comprise a carrier wave (CW) with or without modulation, depending on whether an RFID reader is transmitting data to the RFID transponder or whether the RFID reader is expecting the RFID transponder to transmit data via backscatter modulation. If there is modulated data on the received signal, the modulated data is provided to the data decode block 134, which recovers the data modulated on the signal. The data decode block 134 then provides the recovered data to the processor 136. The data detect block 132 also passes the received signal to the amplifier 138.

The processor 136 can be programmed to cause the RFID transponder to operate in various different ways. If the recovered data comprises data to be written into the memory 116, the processor 136 would thereby command the writing of the data thereto in a first mode of operation. The recovered data may alternatively comprise a command to be executed by the processor 136, such as to retrieve data from the memory 116 to be transmitted to the RFID reader in another mode of operation. The processor 136 thereby retrieves the requested data from the memory 116 and commands the modulator 142 to modulate the data onto the amplified received signal from the amplifier 138. The processor 136 can control the degree of amplification provided by the amplifier 138 using control signals provided thereto. The modulated signal passes in series through the filter 144 and the circulator 120 to the antenna 112, and is radiated therefrom. In yet another mode of operation, the RFID transponder can operate as a repeater, with the processor 136 controlling the amplifier 138 to amplify the received signal and the modulator 142 to add no additional modulation to the received signal. As described above with respect to FIG. 1, the placement order of the modulator 142 and the amplifier 138 within the circuit can be reversed.

Figure 6:
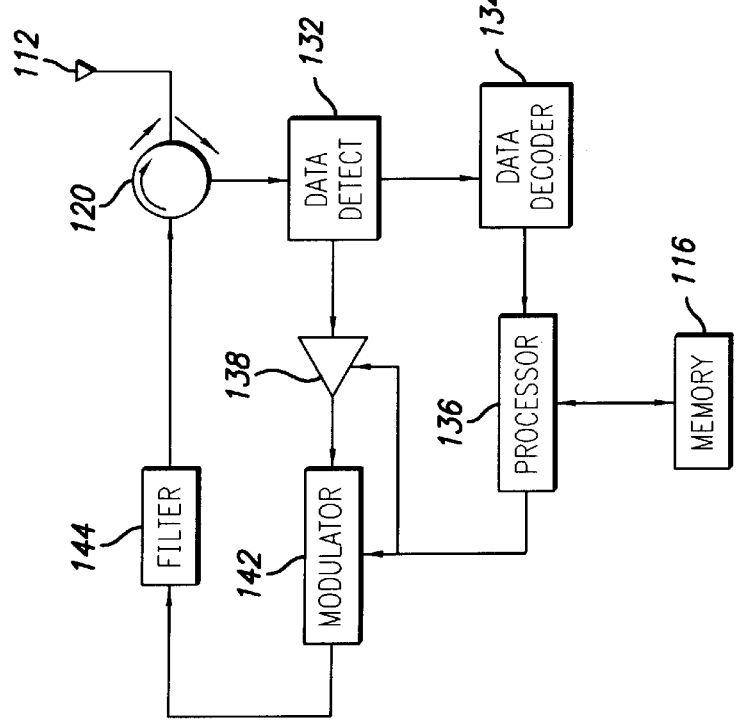
FIG. 6 is a block diagram of an RFID transponder having an active backscatter amplifier in accordance with another embodiment of the invention.

Referring now to FIG. 6, a block diagram of an RFID transponder in accordance with a fourth embodiment of the invention is illustrated. The RFID transponder of FIG. 6 is generally similar to the embodiments described above, but further includes an ability to downconvert a received signal to baseband or an intermediate frequency signal. The active backscatter amplifier would therefore be applicable for use with RFID transponders or other RF communication systems utilizing frequency or phase modulation. The RFID transponder comprises an antenna 112, and circulator 120 as described above with respect to FIGS. 2 and 4. In addition, the RFID transponder includes a data detect block 152, a first RF mixer 156, a first local oscillator 154, a second RF mixer 172, a second local oscillator 168, an amplifier 164, a modulator 162, and filters 158, 166. The circulator 120 has a first port connected to the antenna 112, a second port connected to the data detect block 152 and a third port connected to the second RF mixer 172. The data detect block 152 is connected to the first RF mixer 156. The output of the first RF mixer 156 is connected to the modulator 162 through the filter 158. The modulator 162 is then connected to the amplifier 164, which is connected to the circulator 120 through the filter 166. The memory 116 is connected to the modulator 162. Though not shown in FIG. 6, it should be appreciated that a processor or other control device may be included to control the operation of the various described circuit elements.

A received signal that impinges on the antenna 112 is passed through the circulator 120 to the data detect block 152. The data detect block 152 is adapted to detect modulation on the received signal. If there is modulated data on the received signal, the modulated data is provided to the first RF mixer 156, which mixes the received signal with a carrier signal generated by the first local oscillator 154 to thereby generate a baseband or intermediate frequency (IF) signal. The baseband or IF signal passes though the filter 158 to the modulator 162. The modulator 162 may either add additional modulation onto the baseband or IF signal, or may permit the signal to pass therethrough to the amplifier 164. The amplified baseband or IF signal passes through the second filter 166, and is upconverted back to the carrier frequency by the second RF mixer 172. The upconverted signal then passes through the circulator 120 to the antenna 112, and is radiated therefrom.

Having thus described a preferred embodiment of an RFID transponder having an active backscatter amplifier for re-transmitting a received signal, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. An RFID transponder, comprising:
   an antenna;
   an amplifier operatively coupled to said antenna and adapted to amplify a signal impinging upon said antenna;
   a memory containing stored data;
   a modulator connected to said memory and adapted to selectively modulate said stored data onto said signal; and
   means for maintaining separation between said antenna, said amplifier and said modulator, wherein said amplified signal is returned to said antenna for retransmission therefrom.

2. The RFID transponder of claim 1, wherein said separation maintaining means further comprises a circulator having a first port coupled to said antenna, a second port coupled to said modulator, and a third port coupled to said amplifier.

3. The RFID transponder of claim 2, wherein said circulator further comprises an active electronic device.

4. The RFID transponder of claim 1, wherein said modulator is adapted to amplitude modulate said signal.

5. The RFID transponder of claim 1, further comprising means for detecting data modulated in said signal impinging upon said antenna.

6. The RFID transponder of claim 5, further comprising means for recovering said data modulated in said signal impinging upon said antenna.

7. The RFID transponder of claim 1, further comprising a down-conversion mixer operatively coupled to said antenna, said down-conversion mixer being adapted to mix said signal with a carrier signal to provide an intermediate frequency signal.

8. The RFID transponder of claim 7, wherein said down-conversion mixer is further coupled to said modulator to provide said intermediate frequency signal thereto.

9. The RFID transponder of claim 7, further comprising an up-conversion mixer operatively coupled to antenna, said up-conversion mixer being adapted to mix said signal with said carrier signal to provide an RF signal.

10. The RFID transponder of claim 1, wherein said separation maintaining means further comprises a directional coupler.

11. An RFID transponder, comprising:
   an antenna;
   an amplifier operatively coupled to said antenna and adapted to amplify a signal impinging upon said antenna and reflect said amplified signal back to said antenna;
   a memory containing stored data; and
   means for selectively modulating said amplified signal with: said stored data.

12. The RFID transponder of claim 11, wherein said selectively modulating means is adapted to amplitude modulate said amplified signal.

13. The RFID transponder of claim 11, further comprising means for detecting data modulated in said signal impinging upon said antenna.

14. An RFID transponder, comprising:
   an antenna;
   an amplifier operatively coupled to said antenna and adapted to amplify a signal impinging upon said antenna and reflect said amplified signal back to said antenna;
   a memory containing stored data; and
   means for selectively modulating said amplified signal with said stored data, wherein said amplifier further comprises a field effect transistor having a feedback loop provided between the source and gate terminals thereof.

15. A method for communicating an RF signal transmitted by a base station within a wireless network, comprising:
   disposing a reflecting node in proximity to said base station such that said RF signal will impinge thereon;
   selectively modulating data onto said RF signal, said data being stored in a memory of said reflecting node;
   amplifying said selectively modulated RF signal; and
   reradiating said amplified and selectively modulated RF signal from said reflecting node;
   wherein said reflecting node further comprises an antenna adapted to permit said RF signal to impinge thereon, an amplifier operatively coupled to said antenna and adapted to amplify said RF signal and reflect said amplified signal back to said antenna, and means for selectively modulating said amplified signal with said stored data.

16. The method of claim 15, wherein said selectively modulating step further comprising amplitude modulating said data onto said RF signal.

17. A method for communicating an RF signal transmitted by a base station within a wireless network, comprising:
   disposing a reflecting node in proximity to said base station such that said RF signal will impinge thereon;
   selectively modulating data onto said RF signal, said data being stored in a memory of said reflecting node;
   amplifying said selectively modulated RF signal;
   reradiating said amplified and selectively modulated RF signal from said reflecting node; and
   down-converting said RF signal to an intermediate frequency signal.

* * * * *